July 5, 1932.  R. W. DULL ET AL  1,865,844
FOUR-POINT CONTACT CHAIN
Filed March 7, 1931  3 Sheets-Sheet 1
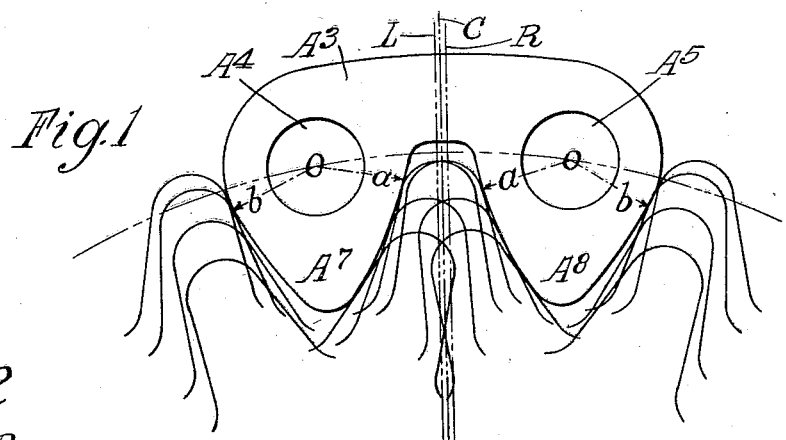
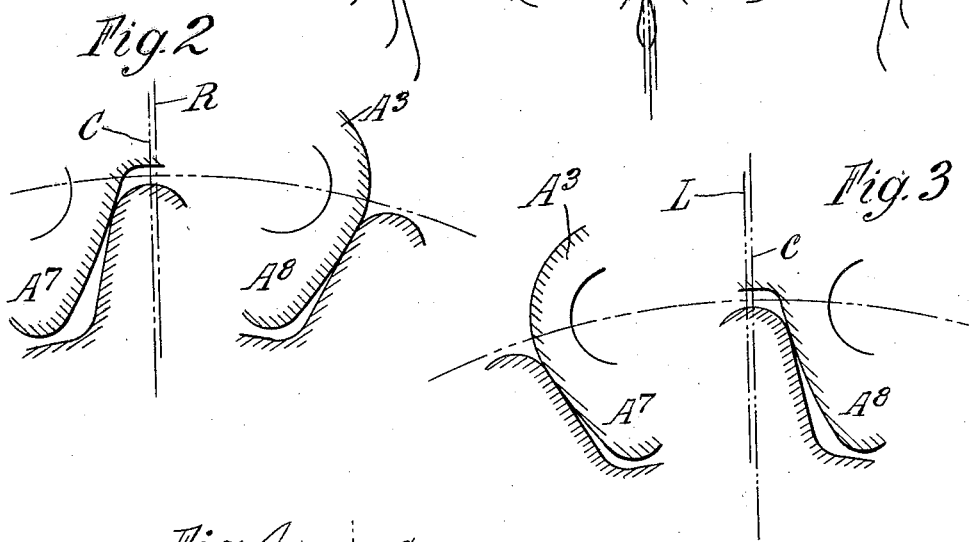
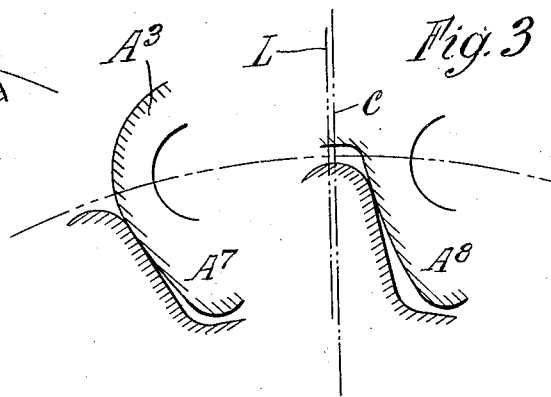
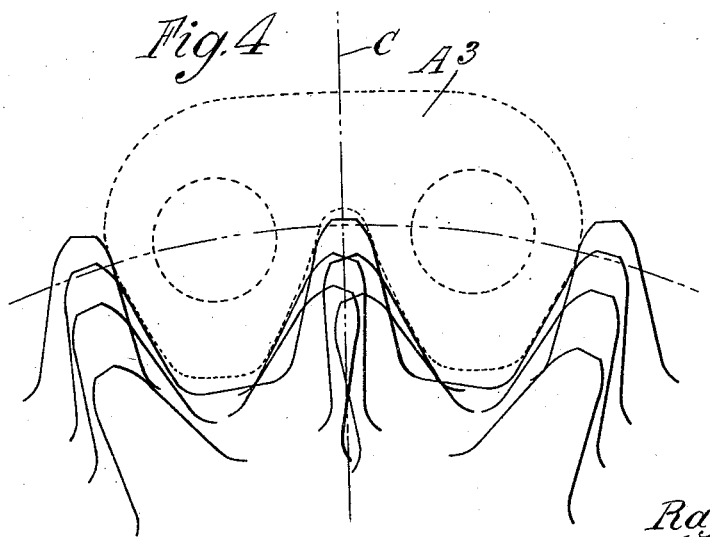
Inventors
Raymond W. Dull
Eric Geertz
by Parker & Carter
Attorneys.

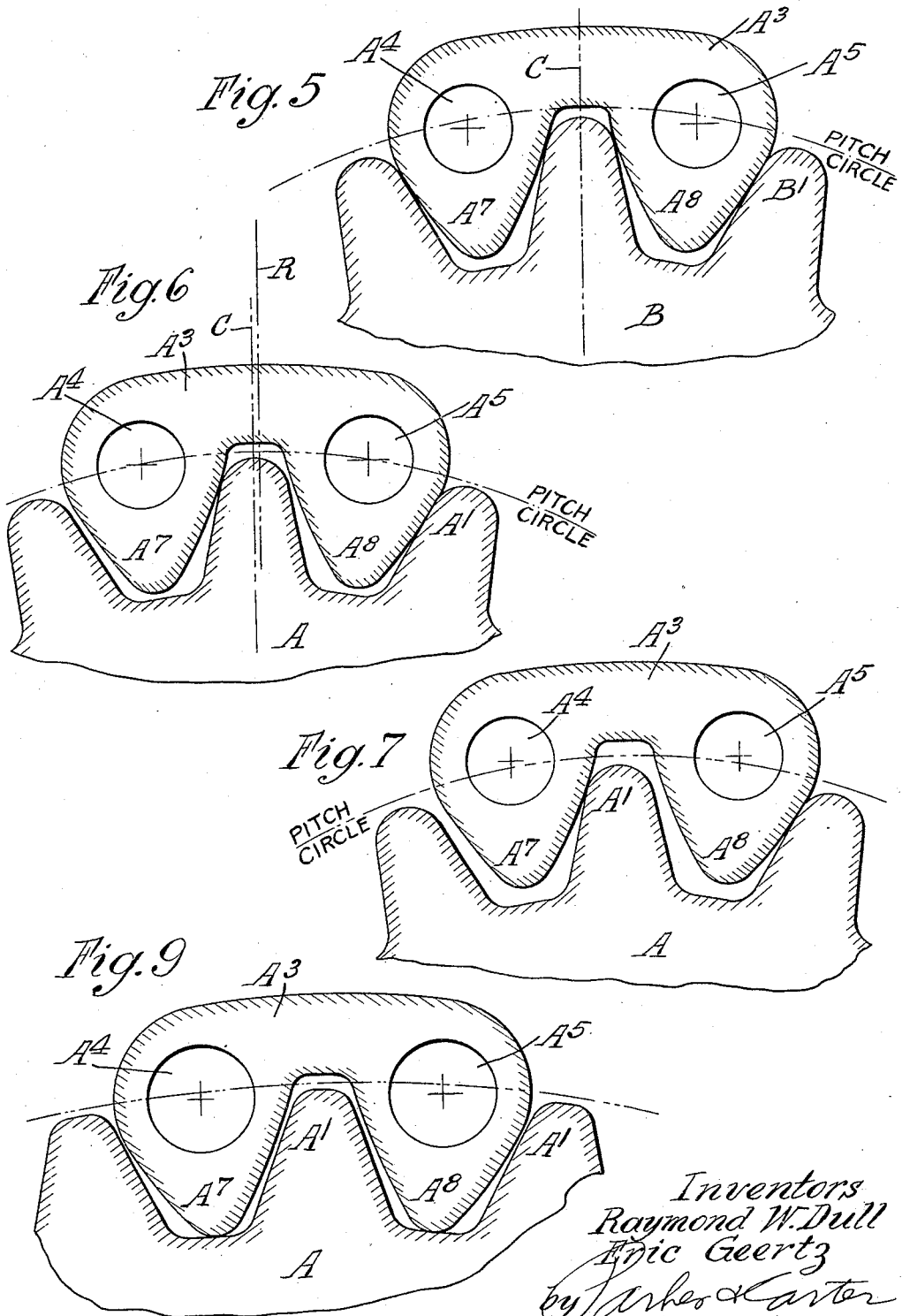

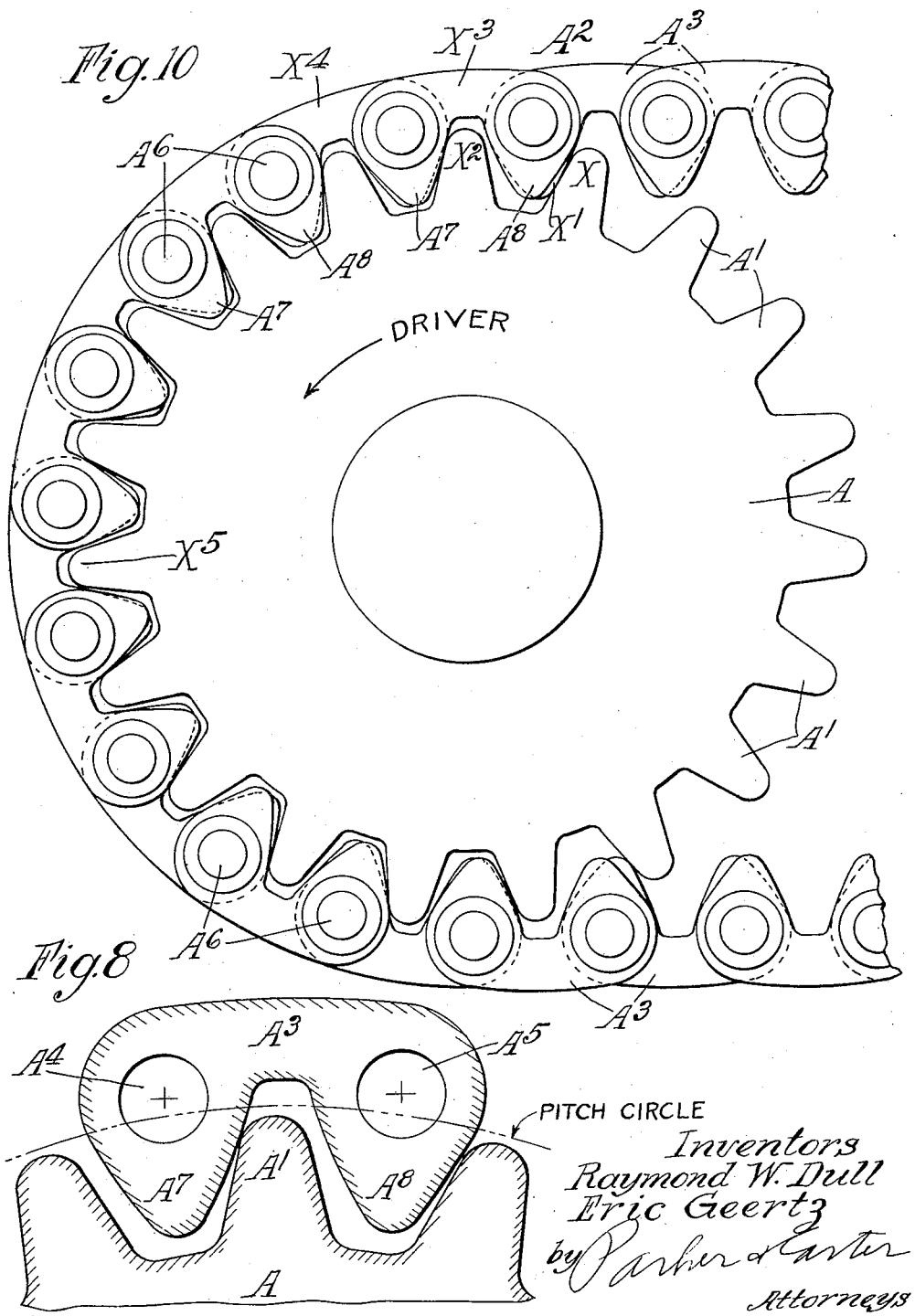

Patented July 5, 1932

1,865,844

UNITED STATES PATENT OFFICE

RAYMOND W. DULL, OF CHICAGO, ILLINOIS, AND ERIC GEERTZ, OF INDIANAPOLIS, INDIANA, ASSIGNORS TO LINK-BELT COMPANY, OF CHICAGO, ILLINOIS, A CORPORATION OF ILLINOIS

FOUR POINT CONTACT CHAIN

Application filed March 7, 1931. Serial No. 520,977.

Our invention relates to improvements in silent chain and has for one object to provide a new and improved form of silent chain wherein silence and accuracy may be combined with maximum length of life resulting from increased areas of contact between chain and sprockets. Our invention in general may be described as a four working surface chain, that is to say, a chain having two teeth on each link, each tooth having two working surfaces, the working surfaces or working faces at the opposed ends of the link being outside working faces, the surfaces on the opposed sides of each link tooth bounding the two sides of the pocket formed between the two teeth being interior working faces. These working faces under various conditions and at various times all work by coming into driving relation with opposed faces on the sprocket teeth. Under some circumstances we may have four point contact in which all four of the working faces on the link simultaneously engage working faces on the sprocket. Under other circumstances we may have two point contact when only the two outside working faces engage sprocket teeth. Under some other circumstances we may have two point contact where the interior working face on one tooth and the exterior working face on another tooth of the link engage the sprocket. But we never have a situation where two interior working faces of a single link engage the sprocket simultaneously and we never have a situation where the interior and exterior working faces of a single chain tooth engage the sprocket simultaneously. A further situation which is sometimes encountered is one when there is but a single point contact between each link and the sprocket and this single contact is always with an interior working face.

These possibilities are all of them present when a single link separate from a chain is placed upon the sprocket and especially the four working surfaces contact is only possible when a single link is placed upon a sprocket and when such link is placed upon a sprocket having a long tooth with a root circle of excessively small diameter. When a single one of our links is placed on a sprocket having a stub tooth, that is a sprocket having a relatively short tooth with a relatively large diameter root circle, inward movement of the link is prevented by engagement of the point of the link teeth with the root circle and under these circumstances two point contact only is possible and that two point contact always is with one interior and one exterior working face of the chain link engaging cooperating sprocket tooth working faces.

As the individual link is moved outwardly along the sprocket tooth to and slightly beyond the pitch circle, this two point contact persists. But as the link is moved radially further away from the pitch circle, a point is reached when only one point contact occurs.

The inter-relation of the articulating links normally prevents inward movement of the individual links making up the chain inside the pitch circle and there is a range of operation through which the chain may elongate either by wear or by stretch without interfering with this two point contact but as the length of the chain exceeds a predetermined maximum which varies for individual chain and sprocket combinations the point is reached where as the chain travels around the sprocket only one point contact occurs. This is because of the angularity of the sprocket teeth, the sprocket tooth engaging the outside working face losing contact so that as the chain is stretched or increased in length beyond a certain point we have only one point interior contact.

This particular relation between the links, be they separate or in a chain, and the sprocket results from the fact that the working faces of each individual link are generated and they are generated with initial clearance as will hereinafter appear. This generation is so related that the clearance is taken into consideration and results from the initial clearance generation so that there is no possibility of locking or binding of individual chain links on the sprocket teeth.

Our invention is illustrated more or less diagrammatically in the accompanying drawings, wherein—

Figure 1 shows the generation of a four working surface link with clearance showing the generation for both link teeth on the same figure;

Figure 2 shows the working surfaces resulting from generation about the right hand axis of generation in Figure 1;

Figure 3 shows the working surfaces resulting from generation about the left hand axis of generation in Figure 1;

Figure 4 shows for purpose of comparison, the generation of an imaginary type of four point contact link without clearance wherein the generation is about a single and not about two spaced axes of generation;

Figure 5 shows a single link in position on a long tooth sprocket with link inside the pitch circle showing four point contact;

Figure 6 shows a single link on the sprocket in the position it would occupy on the pitch circle showing two point contact;

Figure 7 shows a single link on the sprocket in the position it would occupy outside of the pitch circle showing two point contact;

Figure 8 shows a link farther beyond the pitch circle and showing one point interior contact;

Figure 9 shows a single link on a stub tooth sprocket showing how the increased diameter of the root circle of the sprocket prevents anything except two point contact;

Figure 10 shows the action of our chain as it winds under tension onto and off of a sprocket.

Like parts are indicated by like characters throughout the specification and drawings.

A is a sprocket having in the preferred form sprocket teeth $A^1$ which teeth are short so that the sprocket may be described as a stub tooth sprocket. In the modified form shown in Figure 5, for the purpose of illustration only, the sprocket wheel B has a long tooth $B^1$ instead of the stub tooth $A^1$ as shown in the other drawings. $A^2$ is a chain made up of a series of separate chain links $A^3$, $A^5$, each link being perforated at $A^4$ $A^5$ so that pintle pins $A^6$ may join a series of links together to form a silent chain belt. $A^7$ $A^8$ are link teeth adapted to interlock with the sprocket teeth and the teeth are so related and the belt is so built up that it makes no difference which direction the chain goes and makes no difference whether the chain drives the sprocket or the sprocket drives the chain, the relation between chain teeth and the sprocket teeth remaining the same for all conditions so that the chain may wind onto or off of the sprocket without interference.

Our chain is primarily intended for operation in connection with a stub tooth sprocket wherein the relation between the root diameter and the pitch diameter is such that a chain wound about the sprocket is limited in its inward movement toward the center of rotation by engagement between the ends of the chain teeth and the root circle as indicated in Figure 9 so that there is never actually any thing other than two point contact as shown in Figures 6 and 10 or one point contact as shown in Figure 8 and four point contact thus becomes altogether impossible. If a longer tooth were used, then it might be possible to push the chain or the chain links down into the position shown in Figure 5 when four point contact would result but this means the use of a weaker sprocket and one more expensive to manufacture. While under some circumstances such a sprocket might be used, it is ordinarily undesirable and even though such a sprocket is used the chain when at work lies in position with its links as shown in Figures 6 or 10.

Referring now to Figure 1, it will be noted that the distance $o$—$a$, which is the minimum distance from the pintle axis to the interior working surface equals the distance $o$—$b$ which is the minimum distance from the pintle axis to the exterior working surface and this relation prevails on both ends of the link. This relationship, together with the fact that the sprocket teeth are symmetrical means that there will always be, as long as the chain is on the pitch circle, two point contact between the leading faces of the chain teeth and their adjacent sprocket teeth when the chain is driving and the following faces of the chain teeth and their adjacent sprocket teeth when the sprocket is driving. When the chain is old or stretched and lies sufficiently outside the pitch circle then there is only contact with one or the other of the interior faces of the link either the leading or the following as the case may be.

Now referring to Figure 10, if we assume that the gear is driving, the sprocket tooth $x$ drives the chain by interior contact with the chain tooth $x^1$ engaging its following side. The sprocket tooth $x^2$ engages the following faces of the next chain tooth, having inside contact with links $x^3$ and outside contact with links $x^4$. The same is true part way around the gear to some point perhaps at $x^5$ where there is no contact at all after which the contact relation is reversed and the chain begins to pull on the sprocket. A reversal of contact surfaces here takes place.

In the manufacture of silent chain and silent chain sprockets, experience shows that the obtaining of the proper clearance between the chain teeth and the sprocket teeth is of the utmost importance. Perhaps quite as important is the obtaining or generating of correctly related sprocket and chain tooth surfaces, and our present invention to a very considerable extent depends upon the method in which the clearances are obtained.

If we select the sprocket tooth contour and then use this toothed shape on a cutter to generate the chain, we will generate all four working faces of the chain link, as in Figure 4, that is, the two working faces of each link tooth but there will be no clearance between the chain and the sprocket and such a chain will not be satisfactory in operation. In order that the generation may be correct, the clearance may be correct, and chain operation will be correct, we generate pairs of chain tooth faces separately by displacing the center line of the link first to one side and then to the other side of the center line of the straddled sprocket tooth. In other words, instead of generating the link surfaces with the link center line coinciding with the radial center line of the straddled generating sprocket tooth, we displace the link center line to one side or the other side of said tooth center line, thus producing the desired clearances. For the sake of brevity and clarity the radial center line of the straddled generating sprocket tooth will hereinbelow be referred to as the "straddled tooth center line".

In Figure 1 C is the center line of the straddled generating sprocket tooth and R and L represent the displaced link center lines. When generating the required contours of the link teeth from the predetermined sprocket tooth form, the center line of the link is considered to coincide first with R and then with L to obtain respectively the link tooth faces shown in Figures 2 and 3. It will be noted that generation about one of the displaced link center lines gives the required outline for the interior face of one link tooth and the exterior face of the other link tooth. The other pair of link tooth surfaces are similarly obtained by generation about the link center line oppositely displaced from the straddled tooth center line. It will be further noted that the center line of the link during the generating process lies between the straddled tooth center line C and the exterior link tooth face obtained by the generation.

In this connection reference is made to co-pending application of William F. Brandt, Serial No. 351,199, filed March, 1929, for silent chain, wherein there is a detailed discussion of the terms used in connection with silent chain and it will be understood that our invention relates to the same general kind of generation and is a chain having the same kind of conjugate relation between the working parts; the difference being that where Brandt merely discloses the idea of chain generation we have gone a step farther and by generating the working faces about displaced lines of generation we are enabled to get a different kind of chain relation between the chain and the sprocket.

The use and operation of our invention are as follows:

For the purpose of analyzing and explaining the characteristics of the chain made according to our process we will first consider a single chain link placed in contact with a sprocket.

Each link has two teeth and each tooth has two working surfaces, two of these surfaces being inside working surfaces forming the two sides of the pocket between the two link teeth, the two other surfaces being outside working surfaces, one at each end of the link. If the diameter of the root circle of the sprocket is small so that the sprocket is a long tooth sprocket, then a single link may be placed on the sprocket in such a way that all four of the working surfaces engage working surfaces on the sprocket teeth. Under these circumstances and with a sprocket designed for this chain the centers of articulation or the pivot centers of the link will fall inside the pitch circle.

If, however, as in our preferred form, the root circle is a maximum, we have what is called a stub-tooth sprocket, then the points on the two chain teeth, which points take the form preferably of rather sharply curved surfaces between the working faces, engage the root circle of the sprocket and by such engagement the inward radial movement of the link is limited, so that only two point contact is possible. This contact takes the form of simultaneous inside and outside contacts between a sprocket tooth and one inside working face on the link, and one outside working face on the link, this two point contact being related to working faces pointing in the same direction.

If the link is moved angularly with respect to the center of the sprocket, we get two point contact with the other two working faces. This situation may prevail even though the link lies with its centers of articulation inside the normal pitch circle.

If, now, the link is placed on the sprocket at a point at or even outside of the pitch circle, we still can get this two point contact, but as the link is moved radially farther and farther away from the center of rotation and so out considerably beyond the pitch circle, we reach a point where, owing to the angularity of the sprocket teeth, only one point contact is possible and this one point contact is interior contact.

These peculiar relations between sprocket teeth and chain teeth are possible because the chain teeth are generated with initial clearance. Such generation with initial clearance gives a silent chain with the best possible relation between the chain and the sprocket as distinguished from earlier methods where the chain tooth contour is generated by the sprocket and then the space between the teeth is arbitrarily increased to provide clearance. This results because even though we generate the chain teeth properly, when we separate them arbitrarily we change the relation between them and the sprocket teeth and they are no longer in true generated relation with respect to the sprocket teeth.

This generation, with initially generated clearance, is obtained by generating the interior working face of one tooth and the exterior working face of the other tooth about the displaced link center line. Both pairs of working faces are similarly generated, the clearance between them being determined by the distance between these displaced center lines R and L shown in Figure 1.

When a plurality of links, such as those above discussed, are assembled to form a silent chain, it will be understood that the relation between each individual link in the chain and the sprocket will ordinarily be modified by the fact that such link is assembled into a chain and articulated with other links, and especially since such a chain is intended to be used with a stub tooth sprocket the four point contact referred to above as a theoretical possibility will never occur in actual practice.

The two point contact will always occur with the chain links on or slightly outside of the pitch circle.

As the chain elongates under load and wear, the pitch length increases until a point is reached when each link rides out so far on the sprocket that single point contact only occurs, and this contact is always inside contact between one face of the sprocket tooth and one inside working face of the link.

Under some circumstances when the single link above referred to is placed on a sprocket having teeth of slightly different shape from those with which it is primarily intended to cooperate it may happen that instead of getting four point contact with the link inside the pitch circle we only have two point contact with only the two outside working faces of the link touching the sprocket, but we do not want, do not intend to get and on a satisfactory operating sprocket never do get a condition where we have two point interior contact. In other words with a long tooth referring to a single link we always get either four point contact or two point exterior contact but never two point interior contact and none of these situations ever occur under working conditions when the links are assembled to form a silent chain belt and are in driving relation with the sprocket.

We thus have a chain sprocket combination where with the chain as close to the center of rotation of the sprocket as possible two point contact occurs and this two point contact continues to occur as the chain stretches and so rides farther out on the teeth until at some point in the stretching of the chain or the wear of the chain the two point contact disappears and we have one point interior contact. Further stretching or wear of the chain will continue until the chain has become too long to work satisfactorily on the sprocket but up to the time when the chain is no longer satisfactory we still get only a single point interior contact.

We claim:

1. The process of generating a toothed link for silent chains and the like, which consists in generating the working faces of the tooth at one end of the link about link center lines located respectively on opposed sides of the radial center line of the straddled generating sprocket tooth.

2. The process of generating a toothed link for silent chains and the like, which consists in generating the working faces of the tooth at one end of the link about link center lines located respectively on opposed sides of the straddled tooth center line, the link center line about which the interior face of the tooth is generated being on the opposite side of the straddled tooth center line from such face, and the link center line about which the exterior face of the tooth is generated being between the straddled tooth center line and such face.

3. The process of generating a toothed link for silent chains and the like, wherein the link has two teeth which consists in generating those working faces of the link teeth which face in the same direction about one link center line, and those working faces of the link teeth which point in the opposite direction about another link center line.

4. The process of generating a toothed link for silent chains and the like, wherein the link has two teeth which consists in generating those working faces of the link teeth which face in the same direction about one center line, and those working faces of the link teeth which face in the opposite direction about another center line, the center lines being respectively located on opposite sides of the straddled tooth center line.

5. The process of generating a toothed link for silent chains and the like, wherein the link has two teeth which consist in generating those working faces of the link teeth which face in the same direction about one link center line, and those working faces of the link teeth which face in the opposite direction about another link center line, the link center lines being respectively located on opposite sides of the straddled tooth center line, the link center line about which each pair of faces is generated being located between the straddled tooth center line and the exterior working faces of the pair.

6. The process of forming a toothed link for silent chains and the like which consists in generating the working faces of the link about link center lines offset from the straddled tooth center line.

7. The process of forming a toothed link for silent chains and the like which consists in generating the working faces of the link about link center lines offset from the straddled tooth center line, one interior and one exterior working face being generated about each of such offset link center lines.

8. The process of forming a toothed link for silent chains and the like which consists in generating the working faces of the link about link center lines offset from the straddled tooth center line, one interior and one exterior working face being generated about each of such offset link center lines, such center lines of generation being located one on each side of the straddled tooth center line.

Signed at Chicago, county of Cook and State of Illinois, this 26th day of February, 1931.

RAYMOND W. DULL.

Signed at Indianapolis, in the county of Marion and State of Indiana, this 23rd day of February, 1931.

ERIC GEERTZ.